US012719777B2

(12) United States Patent
Jun

(10) Patent No.: US 12,719,777 B2
(45) Date of Patent: Aug. 25, 2026

(54) NETWORK POLLING

(71) Applicant: Kigen (UK) Limited, Cambridge (GB)

(72) Inventor: Jerry Chun-Pai Jun, Safety Harbor, FL (US)

(73) Assignee: Kigen (UK) Limited, Cambridge (GB)

( * ) Notice: Subject to any disclaimer, the term of this patent is extended or adjusted under 35 U.S.C. 154(b) by 191 days.

(21) Appl. No.: 18/794,262

(22) Filed: Aug. 5, 2024

(65) Prior Publication Data

US 2026/0039576 A1 Feb. 5, 2026

(51) Int. Cl.
*H04L 43/103* (2022.01)

(52) U.S. Cl.
CPC .................................. *H04L 43/103* (2013.01)

(58) Field of Classification Search
CPC .................................................... H04L 43/103
See application file for complete search history.

(56) References Cited

U.S. PATENT DOCUMENTS

2011/0072129 A1* 3/2011 Le Pennec .......... H04L 43/0852 709/224
2013/0262697 A1* 10/2013 Karasaridis ........... H04L 67/568 709/242
2013/0267276 A1* 10/2013 Fontes .................. H04L 43/065 455/557
2018/0013793 A1* 1/2018 Belamaric ............... H04L 63/20
2022/0078267 A1* 3/2022 Nixon ................ G05B 19/4186

FOREIGN PATENT DOCUMENTS

CN 115277410 A * 11/2022 ......... H04L 41/0816
DE 102021123544 A1 * 3/2022 ............. H04L 67/12

OTHER PUBLICATIONS

GSMA, "eSIM IoT Technical Specification," Version 1.1, Apr. 26, 2024, 227 pages.
ETSI TS 102 223 Technical Specification, V12.1.0, Smart Cards; Card Application Toolkit (CAT) (Release 12), Sep. 2014, 244 pages.

* cited by examiner

*Primary Examiner* — Chris Parry
*Assistant Examiner* — Abderrahmen Chouat
(74) *Attorney, Agent, or Firm* — NIXON & VANDERHYE P.C.

(57) ABSTRACT

A polling apparatus comprises message issuing circuitry configured to issue at least one polling message over a network to a polled device. Polling filtering circuitry is responsive to a polling trigger requesting that the message issuing circuitry issues a given polling message to determine whether an active domain name system (DNS) server belongs to a set of one or more polling permitted DNS servers. In response to determining that the active DNS server does not belong to the set of polling permitted DNS servers, the polling filtering circuitry is configured to prohibit the message issuing circuitry from issuing the given polling message.

18 Claims, 5 Drawing Sheets

NETWORK POLLING

BACKGROUND

Technical Field

The present technique relates to the field of devices communicating via a network.

Technical Background

In many arrangements, a message issuing device may wish to transmit a message to a target device over a network. However, in many networks, it may not be possible to reliably push a message down to the target device. The push mechanism may not exist, or the target device may often be offline or in a low power state. In these networks, reliability of message delivery may be improved if the target device is configured to poll the message issuing device in order to receive these messages. In an arrangement using polling, the target device may issue polling messages to query the message issuing device to determine whether the message issuing device has any pending messages for the target device, and messages can then be sent in response to the polling messages, which can allow messages to be delivered more reliably than relying on the message issuing device pushing messages to the target device.

SUMMARY

At least some examples of the present technique provide a polling apparatus, comprising:

- message issuing circuitry configured to issue at least one polling message over a network to a polled device, and
- polling filtering circuitry responsive to a polling trigger requesting that the message issuing circuitry issues a given polling message, to:
  - determine whether an active domain name system (DNS) server belongs to a set of one or more polling permitted DNS servers; and
  - in response to determining that the active DNS server does not belong to the set of polling permitted DNS servers, prohibit the message issuing circuitry from issuing the given polling message.

At least some examples provide a method for controlling issuing of polling messages, comprising:

- responsive to a polling trigger requesting issuing of a given polling message over a network to a polled device:
  - determining whether an active domain name system (DNS) server belongs to a set of one or more polling permitted DNS servers; and
  - in response to determining that the active DNS server does not belong to the set of polling permitted DNS servers, prohibiting issuing of the given polling message.

At least some examples provide a network control apparatus, comprising:

- polling status determination circuitry configured to determine a desired polling status for a given polling apparatus, the desired polling status indicating whether the given polling apparatus is permitted to issue at least one polling message over a network; and
- polling control circuitry configured to issue a control message to request that the given polling apparatus updates an indication of an active domain name system (DNS) server in dependence on the desired polling status.

At least some examples provide a method for controlling a network, comprising:

- determining a desired polling status for a given polling apparatus, the desired polling status indicating whether the given polling apparatus is permitted to issue at least one polling message over the network; and
- issuing a control message to request that the given polling apparatus updates an indication of an active domain name system (DNS) server in dependence on the desired polling status.

Further aspects, features and advantages of the present technique will be apparent from the following description of examples, which is to be read in conjunction with the accompanying drawings.

DESCRIPTION OF EXAMPLES

Figure 1:
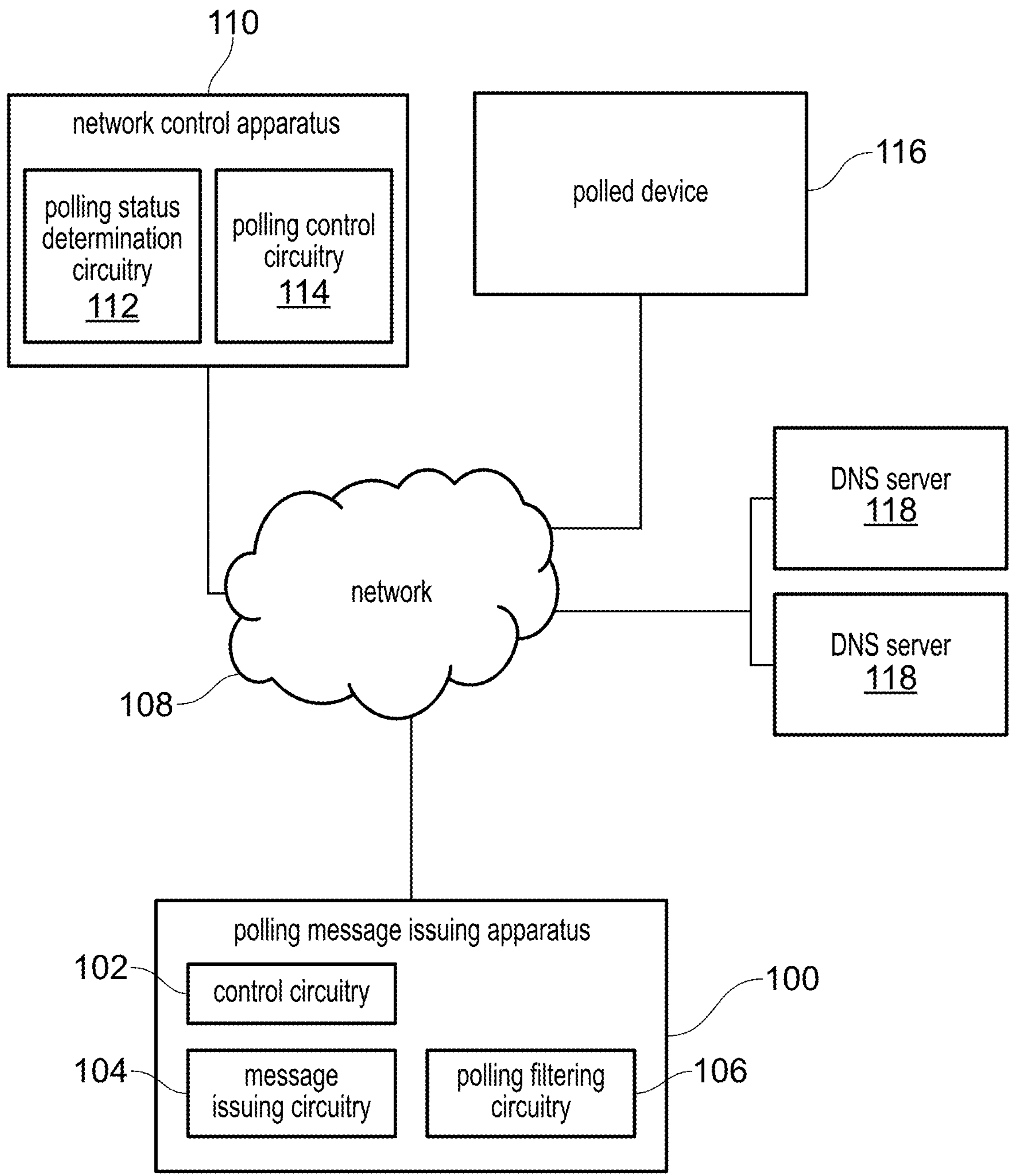
FIG. 1 schematically illustrates a system of devices including a polling apparatus and network control apparatus communicating via a network.

Whilst polling may allow messages to be delivered more reliably over a network, the inventor has realised that polling is associated with several drawbacks. First, handling of polling messages consumes network capacity, reducing capacity from the network for handling other messages. This problem becomes more significant as the number of polling messages on the network increases, for example as the number of devices issuing polling messages over the network increases. Additionally, issuing polling messages has a power cost, and in devices with limited power availability, such as battery powered devices, the issuing of polling messages may have a significant impact on performance of the polling device itself.

Polling messages may be issued at a timing determined by a polling timer. One approach to reduce the negative impacts of polling described above may be to adjust a polling timer so that polling messages are issued less frequently, to reduce the number of polling messages handled by the network and issued by devices. However, reducing a frequency of issuing polling messages means that a message issuing device may have to wait longer before receiving a polling message to transmit a message to the target device, and hence messaging latency may be undesirably increased.

The inventor has realised that performance may be improved whilst reducing the drawbacks of polling by enabling polling messages to be filtered at a device before they are issued to a network. Filtering of unnecessary polling messages may reduce the number of polling messages on the network and reduce power incurred by transmitting unnecessary polling messages, and hence can enable higher frequency polling timers to be used by polling devices, reducing messaging latency.

In particular, examples of the present techniques provide a polling apparatus comprising message issuing circuitry configured to issue at least one polling message over a network to a polled device. The network may for example be a mobile network. The polling message may for example be issued to determine whether the polled device has any pending messages for the polling apparatus.

A polling trigger may request the message issuing circuitry to issue a given polling message, and the polling apparatus also provides polling filtering circuitry to selectively prohibit the message issuing circuitry from issuing the given polling message in response to the polling trigger. The polling filtering is carried out based on an identification of an active domain name system (DNS) server. The active DNS server may be a DNS server assigned to the polling apparatus (e.g., by a network), and in some examples could be queried by the message issuing circuitry to enable the given polling message to be issued. For example, the DNS server may provide a translation between a domain name of the polled device and an internet protocol (IP) address of that polled device to enable to polling messages to be sent. However, the polling device may already store a translation of a domain name and hence use of the active DNS server may not be required for the polling message to be issued. The message issuing circuitry may be able to use several DNS servers, and the active DNS server may be identified for a particular communication session from among a set of accessible DNS servers. Different DNS servers in the set may be considered "active" for different polling apparatuses depending on how which DNS server has been assigned to each polling apparatus. The term "active" does not imply anything about the actual status of the DNS server, which could even be in an inactive state-rather, the term "active" refers to the DNS server address currently assigned to the polling apparatus.

The polling filtering circuitry is responsive to the polling trigger to determine whether the active DNS server belongs to a set of one or more polling permitted DNS servers, and in response to determining that the active DNS server does not belong to the set of polling permitted DNS servers, prohibit the message issuing circuitry from issuing the given polling message. The determination could be made in several ways. For example, the polling filtering circuitry may have access to a whitelist of DNS servers, and if the active DNS server is on the whitelist then it may be determined to belong to the set of polling permitted DNS servers. Alternatively, the polling filtering circuitry may have access to a blacklist of DNS servers, and if the active DNS server is on the blacklist then it may be determined to be excluded from the set of polling permitted DNS servers.

Hence, polling messages may be filtered (e.g., not generated when they might otherwise have been generated if not for the polling filtering circuitry, or not transmitted to the network if already generated) if a polling apparatus has an active DNS server which is not part of a set of polling permitted DNS servers. This may be a particularly powerful technique for filtering polling messages because the entity wishing to issue messages to the polling apparatus may be able to control which DNS server is an active DNS server for a particular polling device, and therefore can control the selection of the active DNS server such that polling messages may only be issued by the polling apparatus when the polling messages are necessary, such as when the polling messages will identify a pending message. Filtering polling messages based on a selection of an active DNS server can therefore allow devices having control of the network to control polling traffic to reduce a volume of polling messages.

In some examples, the polling filtering circuitry may be responsive to determining that the active DNS server does belong to the set of polling permitted DNS servers to permit the message issuing circuitry to issue the at least one polling message. Hence, whether or not the active DNS server is within the set of polling permitted DNS servers can be used to control whether or not polling messages are issued.

In some examples, the polling apparatus may comprise control circuitry responsive to a control message received over the network to update an indication of one or more active DNS servers (the network may assign a new DNS server to the polling apparatus). Updating an indication of an active DNS server may for example enable the active DNS server to be updated from one not in the set of polling permitted DNS servers to one in the set of polling permitted DNS servers, and hence updating the indication of the active DNS server may change whether polling messages are filtered or not. Therefore, the control circuitry may enable control messages received over the network to control whether polling messages should be filtered or not, which can allow network devices to control polling traffic over the network and reduce issuing of unnecessary polling messages.

In some examples, the control message may provide an indication of a replacement DNS server to use as the active DNS server. Hence, the control message may be able to specify a replacement DNS server within or outside of the set of polling permitted DNS servers to control whether polling messages should be filtered.

In some examples, the control circuitry may be configured to update the indication of an active DNS server to indicate a replacement DNS server, to be used as the new active DNS server, identified by a DNS update message. The DNS update message may for example be the control message requesting the DNS server update, or could be a message received separately.

In some examples, the control message may comprise a request for the polling apparatus to reconnect to the network. The active DNS server may be defined for a given communication session, and hence reconnecting to the network may cause an indication of an active DNS server to be updated, allowing the active DNS server to be replaced with one in or out of the set of polling permitted DNS servers. The DNS update message may be received by the polling apparatus in response to a request to reconnect to the network, and specify the DNS server to use as the active DNS server following reconnection to the network.

In some examples, non-polling message issuing circuitry may be configured to issue at least one non-polling message over the network, for example using the active DNS server, and whether issuing of the at least one non-polling message is permitted may be independent of whether the active DNS server belongs to the set of one or more polling permitted DNS servers. Hence, whilst the selection of the active DNS server may be used to filter polling messages, the selection of an active DNS server may not be used to filter at least one type of non-polling message. At least some non-polling messages may be transmitted regardless of the indication of the active DNS server.

The polling trigger may be provided in different ways. In some examples, the polling apparatus may act as an aggregator of polling messages received from one or more separate devices. The polling apparatus may issue a polling message on the network in response to a request from a separate polling message generating device, and receipt of a request from a polling message generating device may act as a polling trigger.

In some examples, the polling apparatus may comprise polling message generation circuitry to generate the at least one polling message, wherein the polling message generation circuitry is configured to provide the polling trigger. Hence, the polling messages may be generated internally within the polling apparatus. The polling trigger in such examples may for example be issued at intervals, such as regular intervals, to enable polling messages to be issued at a desired frequency. In some examples, the polling message generation circuitry may be configured to generate the at least one polling message based on a polling timer. As discussed above, the filtering of polling messages means that polling messages can only be issued during limited periods of time, and hence enables higher frequency polling timers to be used without increasing a number of polling messages ultimately issued to the network. The present techniques therefore support the use of higher frequency polling timers, which can reduce messaging latency.

The present techniques are applicable in a range of different situations. In some examples, the message issuing circuitry may comprise internet of things (IoT) message issuing circuitry configured to issue polling messages for an IoT device (e.g., the polling apparatus may itself be an IoT device or may be a device to aggregate polling messages for a group of IoT devices). The advantages of the present technique may be particularly pronounced for an IoT device. There may be expected to be a large number of IoT devices communicating via a network, so unrestricted issuing of polling messages from each IoT device could contribute a significant volume of network traffic and hence impact network capacity significantly. In addition, IoT devices may have restricted power capacity, often being powered by a battery, and hence the reduction in power cost which may be obtained by filtering issuing of polling messages may be particularly beneficial to an IoT device.

IoT devices are also an example of devices which may operate in a lower power mode (such as a power saving mode (PSM) or extended discontinuous reception (eDRX)). In a lower power mode, a device may not be able to receive messages. Without the benefit of the present techniques, a device may not support polling and hence messages may be sent to the device even without being requested by that device, and hence may be sent whilst the device is in a lower power mode and unable to receive the messages. Therefore, without the present techniques a device may require a network to support a message buffering capability to enable messages to be buffered whilst the device is in a lower power mode. However, the present techniques reduce the requirement to buffer device-terminated messages because messages may not be issued until requested by a polling message (sent whilst the polling apparatus is not in a lower power mode), and polling messages may be viable due to the provision of polling message filtering circuitry. On wakeup from a lower power mode a device may query the network to determine whether there is a requirement to update the indication of the active DNS server, which can enable polling messages to be issued after leaving the lower power mode without requiring significant message buffering.

In some examples, the polled device may comprise a device for controlling mobile network profiles for the polling apparatus. For example, the polled device may comprise an embedded subscriber identity module (eSIM) IoT remote manager (eIM). An eIM may for example provide device management services for a set of IoT devices. For example, the eIM may enable mobile network profiles to be installed on the eSIM of IoT devices, for example by initiating a profile download from a subscription manager data preparation plus (SM-DP+) server. The eIM may also be configured to perform profile state management operations (PSMOs) for IoT devices. The functionality of the eIM may for example be defined according to the GSMA SGP.32 specification. Polling may be particularly important for messages from an eIM, as these messages may be important in controlling IoT devices.

In some examples, the polling messages may be generated by a universal integrated circuit card (UICC) and issued over a mobile network. In some examples, the UICC may be an embedded UICC (eUICC). In some examples, the polling filtering circuitry may be associated with the UICC. For example, the polling filtering circuitry may be provided by the UICC.

In some examples, the polling filtering circuitry may comprise an IoT profile assistant (IPA). The IPA may provide functionality for controlling the UICC of a particular IoT device, and in particular may control PSMOs and profile operations for that IoT device. The IPA may therefore act as an interface between the UICC and a particular eIM, and hence be positioned to filter polling messages for the eIM originating at the UICC, or selectively generate polling messages in response to requests by the UICC. The IPA may be associated with a given UICC (or eUICC). In some examples, the IPA may be an embedded IPA (IPAe) provided by the eUICC, or alternatively may be provided separately from the eUICC by the device in which the eUICC is embedded (as an IPAd).

As discussed above, filtering polling messages based on an indication of an active DNS server allows devices to control whether a particular polling device is permitted to issue polling messages on the network, by changing the active DNS server for that polling device. Therefore, in some examples, the present techniques also provide a network control apparatus, comprising polling status determination circuitry configured to determine a desired polling status for a given polling apparatus (e.g., a given IoT device), the desired polling status indicating whether the given polling apparatus is permitted to issue at least one polling message over a network (to a polled device, e.g., an eIM), and polling control circuitry configured to issue one or more control messages to request that the given polling apparatus updates an indication of an active domain name system (DNS) server in dependence on the desired polling status. In some examples, the control messages may be issued over the same network as the polling messages. The control messages may for example comprise an initial request to update the indication of an active DNS server, and a subsequent message identifying a replacement DNS server.

In response to the desired polling status indicating that the given polling apparatus is permitted to issue the at least one polling message, the polling control circuitry may be configured to issue one or more control messages requesting that the given polling apparatus updates the indication of the active DNS server to indicate an active DNS server belonging to a set of one or more polling permitted DNS servers.

In response to the desired polling status indicating that the given polling apparatus is not permitted to issue the at least one polling message, the polling control circuitry may be configured to issue one or more control messages requesting that the given polling apparatus updates the indication of the active DNS server to indicate an active DNS server excluded from a set of one or more polling permitted DNS servers.

The desired polling status may be determined in different ways. In some examples, the polling status determination circuitry may be configured to determine that polling is permitted for the given polling apparatus in dependence on a determination of a requirement to issue a message to the given polling apparatus. For example, a polled device to be polled by the polling apparatus may indicate a requirement to issue a message to the polling apparatus, and such an indication may be used to determine that polling should be permitted for the given polling apparatus to enable the message to be delivered in response to the polling message. In examples in which the polling apparatus comprises an eUICC and the polled device comprises an eIM, this can allow a particular eUICC to poll the eIM so that PSMOs can be performed, at the request of the eIM determining that a PSMO is desired.

The desired polling status may also be influenced by further factors, such as current conditions of the network. For example, if a network is being heavily utilised, then the desired polling status may indicate that a given polling apparatus is not permitted to issue the at least one polling message, even if there is a message pending for the given polling apparatus. It may for example be desired to delay the delivery of a polling message until network utilisation is lower, or for another reason. Hence, whilst the desired polling status may be determined in dependence on whether there is a requirement to issue a message to the given polling apparatus, the desired polling status may also be determined in dependence on further factors (such as whether the network allows the message to be delivered at this time).

Particular examples will now be described with reference to the Figures.

FIG. 1 schematically illustrates a system of devices communicating via a network.

Figures 2, 3:
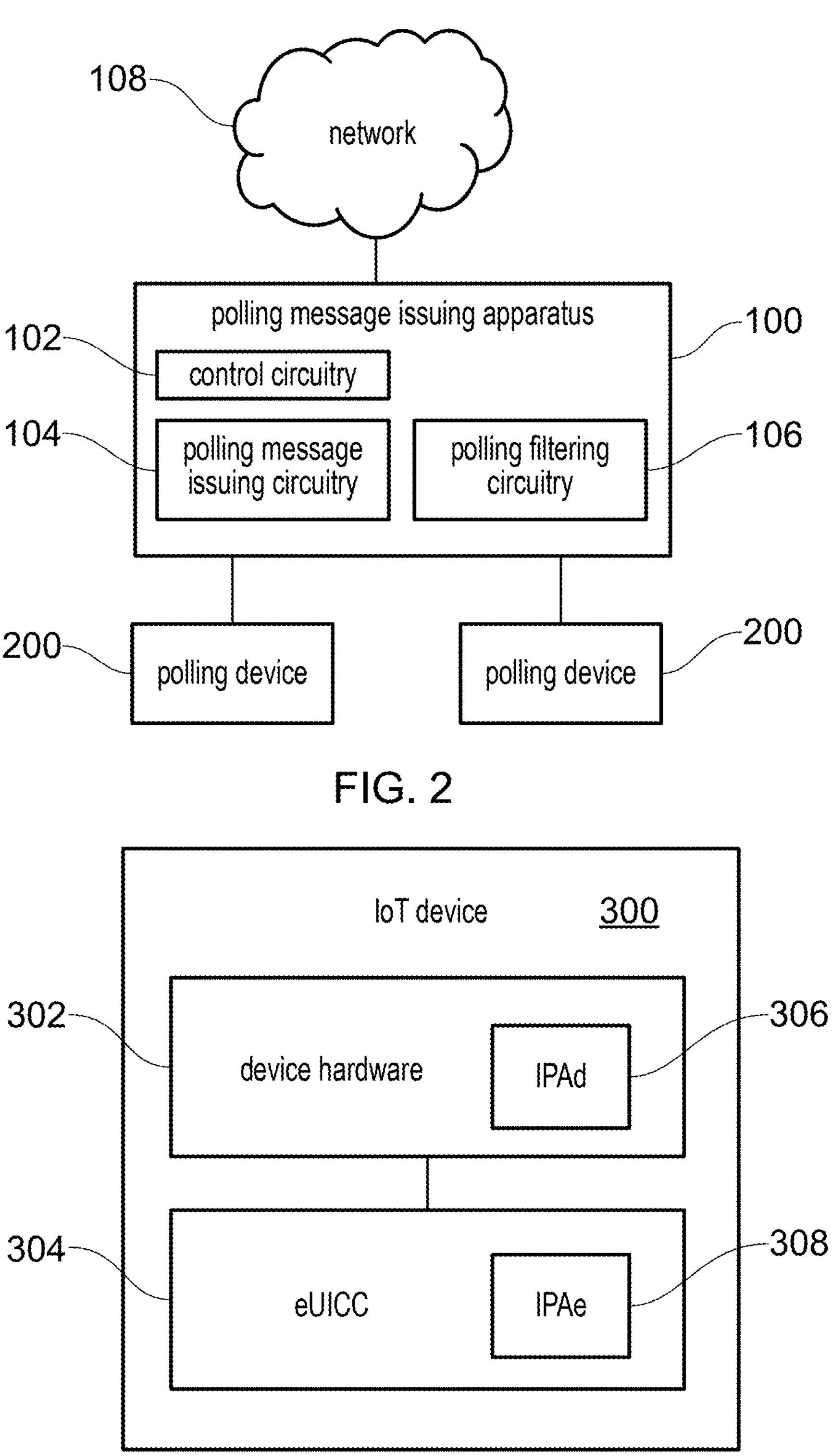
FIG. 2 illustrates a polling message aggregator example of a polling apparatus.
FIG. 3 illustrates an example of an IoT device.

FIG. 1 illustrates polling message issuing apparatus 100 for issuing polling messages over the network 108. The polling apparatus 100 may generate polling messages itself, or may act as an aggregator of polling messages generated externally, as shown in FIG. 2. The polling apparatus 100 comprises message issuing circuitry 104 configured to issue polling messages and non-polling messages over the network 108, control circuitry 102 to control the polling apparatus, and polling filtering circuitry 106 to selectively prohibit polling messages being issued by the message issuing circuitry 104.

The polling messages issued by the polling apparatus 100 may be transmitted via the network 108 to a polled device 116. The polling messages may for example be for determining whether the polled device 116 has any pending messages for the polling apparatus 100. The polled device 116 is not particularly limited, and may for example be a server responsible for performing management operations for the polling apparatus 100.

The polling apparatus 100 is also configured to query one or more domain name system (DNS) servers 118 to support communication with devices via the network. A DNS server 118 may provide a translation from a domain name of a device the polling apparatus wishes to communicate with, and an internet protocol (IP) address of that device. Hence, a DNS server 118 may enable communication with a particular target device. The polling apparatus may have access to two or more different DNS servers 118, and may locally store an indication of one or more active DNS servers to use for communication at a given time, where the active DNS servers may be assigned to the device by the network 108. Although shown as one network 108, different communication channels could be used for accessing the DNS servers 118 and the polled device 116.

The polling filtering circuitry 106 uses the indication of the one or more active DNS servers 118 to selectively filter polling messages. In particular, the polling filtering circuitry 106 may have access to an indication of a set of polling permitted DNS servers, such as a locally stored whitelist or blacklist indicating which of the DNS servers 118 are polling permitted DNS servers. The indication of the polling permitted DNS servers may be static, or may be configured (e.g., by devices on the network or the polled device 116).

In response to a polling trigger requesting the message issuing circuitry 104 to issue a polling message, the polling filtering circuitry 106 is configured to check whether the active DNS server is in the set of polling permitted DNS servers. If the active DNS server is in the set of polling permitted DNS servers, then the polling message may be issued to the polled device 116 via the network 108. If the active DNS server is not in the set of polling permitted DNS servers, then the polling filtering circuitry 106 prevents the polling message from being issued to the network 108. If there is more than one active DNS server, then it may be required that a particular DNS server is, or all DNS servers are, in the set of polling permitted DNS servers to allow the polling message to be issued.

FIG. 1 also illustrates a network control apparatus 110. The network control apparatus 110 could in some examples be incorporated with the polled device 116. The network control apparatus 110 comprises polling status determination circuitry 112 and polling control circuitry 114.

The polling status determination circuitry 112 is configured to determine a desired polling status for polling apparatuses 100, indicating whether those polling apparatuses 100 should be permitted to issue polling messages to the network 108. The polling control circuitry 114 is configured to issue control messages to update the active DNS servers for a given polling apparatus 100 to change whether that polling apparatus 100 is permitted to issue polling messages or not. In particular, updating the active DNS server for a polling apparatus may comprise providing a new active DNS server which is in the set of polling permitted DNS servers when the desired polling status indicates that the given polling apparatus should be permitted to issue polling messages, and providing a new active DNS server which is excluded from the set of polling permitted DNS servers when the desired polling status indicates that the given polling apparatus should not be permitted to issue polling messages. If there is more than one active DNS server, then preventing polling may comprise updating the list of active DNS servers to include no DNS servers in the set of polling permitted DNS servers.

The polling status determination circuitry 112 may determine the desired polling status in various ways, but in one example it may be determined that polling messages from a particular polling apparatus 100 are desired when a polled device 116 has messages pending for that polling apparatus 100, and network capacity is currently sufficient to support the polling messages.

FIG. 2 illustrates a polling message aggregator example of the polling apparatus 100 for issuing polling messages to the network 108 based on requests received from one or more polling message generating devices 200. In such an example, polling devices 200 may wish to issue polling messages to a polled device 116 and hence issue a request to the polling apparatus 100. The polling request may act as a polling trigger, and the polling apparatus 100 may selectively issue the polling message over the network or prohibit the polling message from being issued depending on an active DNS server. The use of a polling message aggregator may for example support the use of low power IoT devices as polling devices, which may not have to support the filtering functionality and network capabilities of the polling apparatus 100.

Figure 4:
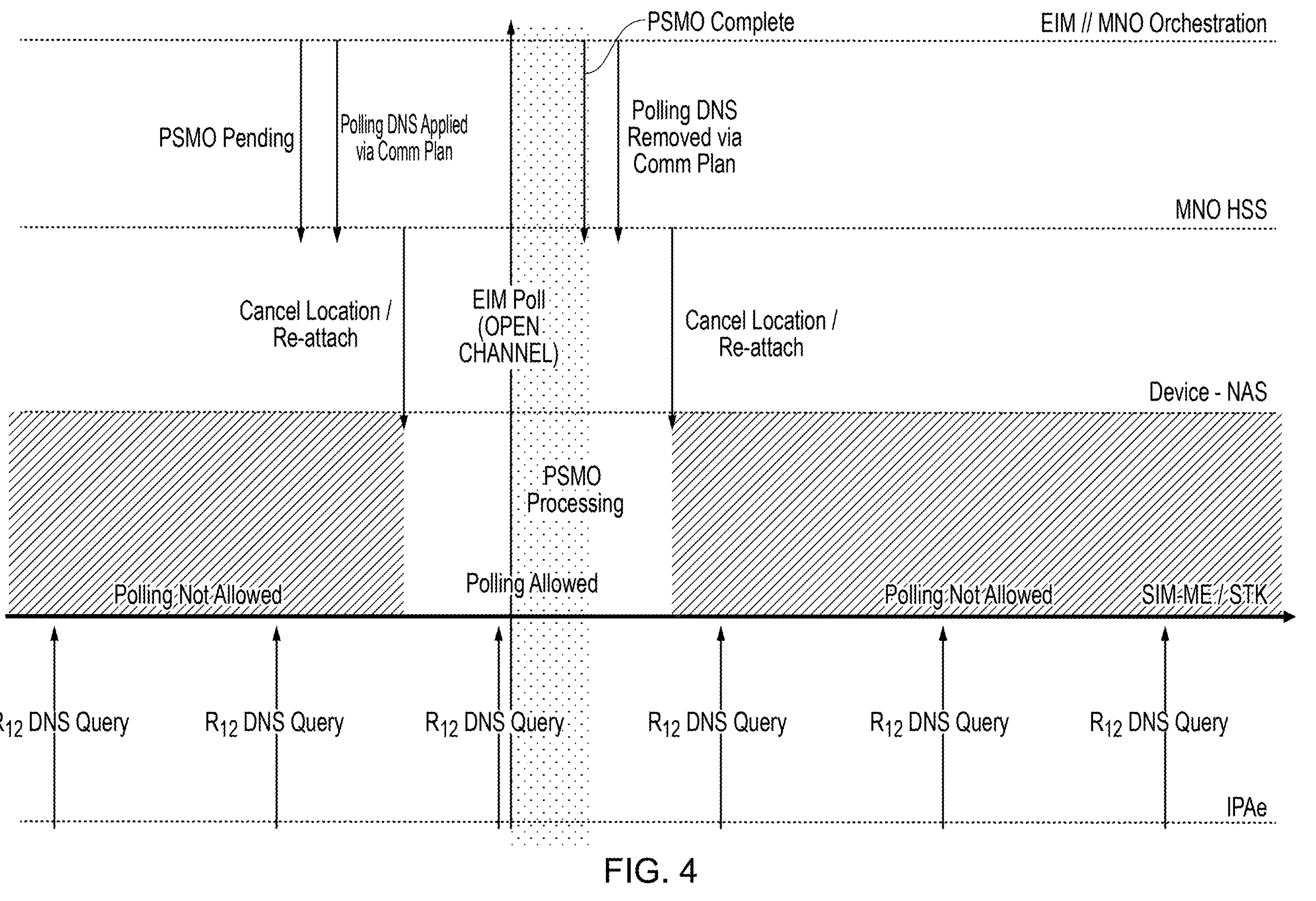
FIG. 4 is a diagram illustrating a series of operations performed by devices communicating via a mobile network.

FIG. 3 illustrates an example of an IoT device 300 which may act as a polling apparatus 100. The IoT device comprises device hardware 302 and an embedded universal integrated circuit card (eUICC) 304. The eUICC stores one or more subscriber identity module (SIM) profiles allowing the IoT device to communicate via a mobile network. The SIM profiles of the eUICC 304 may require management from the network, e.g., to download a new profile or update an existing profile, and hence the eUICC may issue polling messages to a polled device to determine whether any management operations are pending, as shown in FIG. 4. The IoT device 300 comprises an IoT profile assistant (IPA) to perform functions to enable the eUICC to manage SIM profiles, for example by communicating with an eSIM IoT remote manager (eIM). The IPA may for example be responsible for polling the eIM, and hence act as a source of polling messages for the IoT device. The IPA may be installed on the hardware of the IoT device, as an IPAd 306, or may be integrated with the eUICC as an IPAe 308.

FIG. 4 is a diagram illustrating a series of operations performed by devices communicating via a mobile network. Time flows left to right in FIG. 4.

The bottom line of FIG. 4 illustrates operations performed by an embedded IoT profile assistant (IPAe) associated with a particular embedded universal integrated circuit card (eUICC) in an IoT device. The eUICC stores subscriber identity module (SIM) profiles to enable the IoT device to communicate via a mobile network, and the IPAe is responsible for managing the SIM profiles of the eUICC. The IPAe may communicate with an eSIM IoT remote manager (eIM) to control management of profiles on the eUICC, and hence the IPAe may wish to poll the eIM to determine whether any messages are pending for the IPAe. The IoT device therefore provides an example of a polling apparatus 100 and the eIM provides an example of a polled device 116 (and network control apparatus 110).

The IPAe issues domain name system (DNS) server address requests to the hardware of the IoT device (e.g., via the SIM toolkit (STK)) at regular polling intervals. The DNS server address request requests an indication of an active DNS server to be used to communicate with the network. A DNS server address request may for example comprise an OPEN CHANNEL class “aa” request defined according to the ETSI Card Application Toolkit technical specification (ETSI TS 102 223) (Release 12 and higher).

In response to the indication of the active DNS server, the IPAe determines whether the active DNS server belongs to a set of polling permitted DNS servers, e.g., by checking whether the active DNS server is on a polling whitelist/blacklist.

If the active DNS server is found not to belong to the set of polling permitted DNS servers, then the IPAe prevents a polling message from being issued to the network. If the active DNS server is not in the set of polling permitted DNS servers then this may for example indicate that the eIM does not have any pending messages for the IPAe and has hence controlled the active DNS server to not belong to the set of polling permitted DNS servers. As polling messages are not transmitted to the network, this reduces usage of network capacity due to unnecessary polling, and reduced a power requirement (e.g., a transmitter power requirement) associated with issuing the polling message over the network.

If the eIM determines that there is a profile state management operation (PSMO) pending for a particular eUICC, then it may wish to receive polling messages from that eUICC to enable the PSMO messages to be issued. FIG. 4 illustrates the eIM indicating to a mobile network operator (MNO) that a PSMO is pending. Following determination of the pending PSMO, the eIM requests that the DNS server for the target eUICC is updated to enable polling messages to be issued by that eUICC. In response, the network may update the provisioning of the target eUICC. Hence, a message may be transmitted to the device comprising the eUICC, such as a cancel location/re-attach request issued to the IoT device, to re-attach to the network.

In reconnecting to the network, the DNS address of the new active DNS server following reconnection may be provided to the device as part of the re-attach procedure, where the new active DNS server is in the set of polling permitted DNS servers. For example, the IoT device may issue an EMM ATTACH REQUEST message to request reconnection to the network, and in response an EMM ATTACH ACCEPT message may be transmitted to the device specifying the DNS server address of a DNS server in the set of polling permitted DNS servers, to be used as the new active DNS server (alternatively the DNS server address may be specified in an ESM Activate Default Context Bearer Request).

As a result of updating the indication of the active DNS server, at the next DNS query issued by the IPAe (e.g., the next polling timer), the response indicates to the IPAe that the active DNS server is now in the set of polling permitted DNS servers. Hence, the IPAe does not prohibit a polling message from being issued. Therefore, a poll is issued from the IPAe to the eIM to determine whether the eIM has any pending messages for that particular eUICC. The poll identifies the pending PSMO for the target eUICC (which triggered the re-attach message) and hence allows the PSMO to be performed.

If another DNS query were issued at this point, a further poll would be transmitted to the network.

However, following completion of the PSMO the eIM requests that the active DNS server of the target eUICC is once again updated, now to assign a new DNS server not belonging to the set of polling permitted DNS servers and therefore to prevent the target eUICC from issuing further polling messages on the network, which would now be unnecessary as the pending PSMO has been completed. A further request is therefore transmitted to the IoT device to request that the IoT device re-connect to the network, and in the process of reconnecting the eUICC is assigned a new DNS server not belonging to the set of polling permitted DNS servers.

Therefore, in response to the next DNS query from the IPAe it is determined that the active DNS server is not in the set of polling permitted DNS servers and further polling messages are therefore prohibited.

Figure 5:
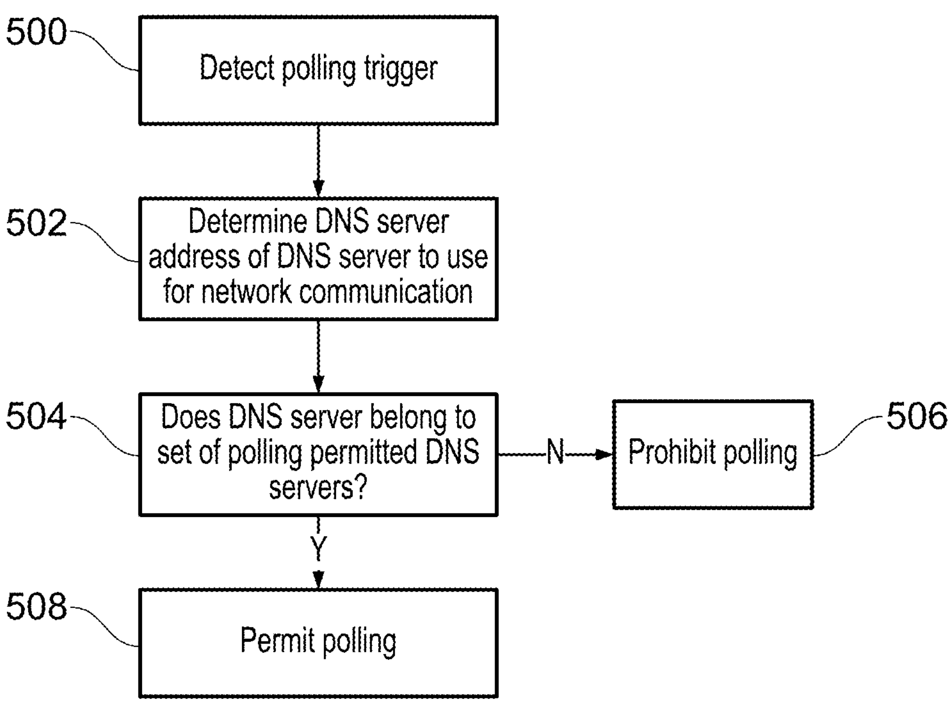
FIG. 5 is a flow diagram illustrating a method for a polling apparatus to selectively filter polling messages.

FIG. 5 is a flow diagram illustrating a method for a polling apparatus to selectively filter polling messages. At step 500 the polling apparatus detects a polling trigger. For example, a polling timer (e.g., maintained by an IPAe) may indicate that a polling message is desired, or a polling message may be received from a polling device.

At step 502, polling filtering circuitry 106 determines a DNS server address of an active DNS server. For example, an IPAe may issue a DNS OPEN CHANNEL class “aa” request.

At step 504, the polling filtering circuitry 106 determines whether the active DNS server belongs to a set of one or more polling permitted DNS servers. If so, then at step 506 polling is permitted and the message issuing circuitry 104 issues a polling message over the network 108.

If the active DNS server does not belong to the set of polling permitted DNS servers, then polling is prohibited and at step 508 the message issuing circuitry does not issue a polling message to the network 108.

Figure 6:
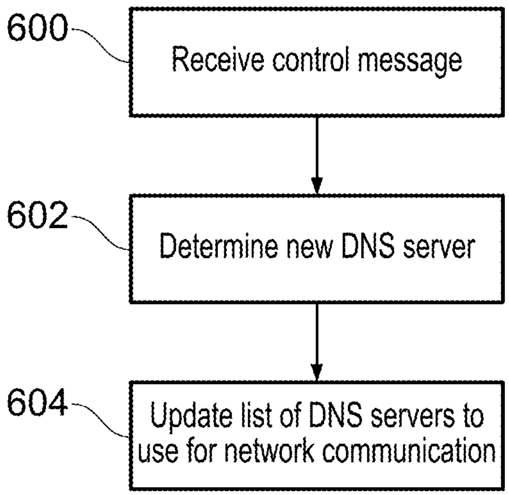
FIG. 6 is a flow diagram illustrating a method for a polling apparatus to update an indication of an active DNS server.

FIG. 6 is a flow diagram illustrating a method for a polling apparatus to update an indication of an active DNS server. At step 600, control circuitry 102 receives a control message over the network 108. For example, the control message may request the polling apparatus 100 to reconnect to the network 108.

At step 602, the control circuitry responds to the control message and as a result determines a replacement active DNS server. For example, the polling apparatus 100 may reconnect to the network, and in the process be assigned a new active DNS server (e.g., in response to a request to reconnect to the network).

At step 604, the control circuitry updates a list of one or more active DNS servers to include the replacement active DNS server determined at step 602 and optionally remove a previous active DNS server.

Figure 7:
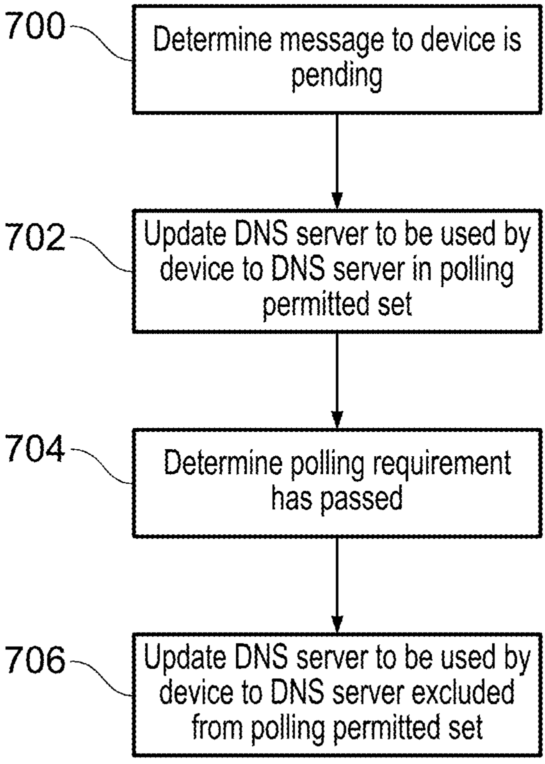
FIG. 7 is a flow diagram illustrating a method for a network control apparatus to update an indication of an active DNS server for a polling apparatus.

FIG. 7 is a flow diagram illustrating a method for a network control apparatus to update an indication of an active DNS server for a polling apparatus. At step 700, polling status determination circuitry 112 of the network control apparatus 110 determines a polling requirement for a polling apparatus 100. For example, the polling status determination circuitry 112 may determine that a polled device 116 has a pending message for the polling apparatus 100, and that the network utilisation is currently low enough to allow polling messages to be issued. At step 700 the polling apparatus may be prohibited from polling, having no active DNS server in the set of polling permitted DNS servers.

At step 702, the polling control circuitry 114 issues a control message to cause the polling apparatus to update an indication of an active DNS server, to include a DNS server in the set of polling permitted DNS servers. Hence, the polling apparatus is permitted to poll the polled device, and the pending message may be sent to the polling apparatus in response.

If the polling apparatus is in a low power mode when the control message is issued, then the control message may not be received by the polling apparatus. The polling apparatus may query the network after leaving the low power mode to determine whether any control messages were issued and not received, and can therefore update the indication of the active DNS server after leaving the low power mode. For example, the re-attach may be triggered upon the next tracking area update (TAU) when the device is in a power saving mode (PSM), or the next Paging Time Window when the device is in an extended discontinuous reception (eDRX) mode.

At step 704, it is determined that a polling requirement has passed once the pending messages have been sent to the polling apparatus and any subsequent operations have completed. Hence, it may be desired for the polling apparatus to be prohibited from issuing further polling messages, which may be considered unnecessary.

Therefore, at step 706 the polling control circuitry 114 issues a control message to cause the polling apparatus to update an indication of an active DNS server, to exclude a DNS server in the set of polling permitted DNS servers from the active DNS servers.

Some examples are set out in the following clauses:

1. A polling apparatus, comprising:
   - message issuing circuitry configured to issue at least one polling message over a network to a polled device, and
   - polling filtering circuitry responsive to a polling trigger requesting that the message issuing circuitry issues a given polling message, to:
     - determine whether an active domain name system (DNS) server belongs to a set of one or more polling permitted DNS servers; and
     - in response to determining that the active DNS server does not belong to the set of polling permitted DNS servers, prohibit the message issuing circuitry from issuing the given polling message.

2. The polling apparatus according to clause 1, wherein the polling filtering circuitry is responsive to determining that the active DNS server does belong to the set of polling permitted DNS servers to permit the message issuing circuitry to issue the at least one polling message.

3. The polling apparatus according to any preceding clause, comprising control circuitry responsive to a control message received over the network to update an indication of one or more active DNS servers.

4. The polling apparatus according to clause 3, wherein the control circuitry is configured to update the indication of an active DNS server to indicate a replacement DNS server identified by a DNS update message.

5. The polling apparatus according to any of clauses 3 and 4, wherein the control message comprises a request for the polling apparatus to reconnect to the network.

6. The polling apparatus according to any preceding clause, comprising non-polling message issuing circuitry configured to issue at least one non-polling message over the network; and whether issuing of the at least one non-polling message is permitted is independent of whether the active DNS server belongs to the set of one or more polling permitted DNS servers.

7. The polling apparatus according to any preceding clause, comprising polling message generation circuitry to generate the at least one polling message, wherein the polling message generation circuitry is configured to provide the polling trigger.

8. The polling apparatus according to clause 7, wherein the polling message generation circuitry is configured to generate the at least one polling message based on a polling timer.

9. The polling apparatus according to any preceding clause, wherein the message issuing circuitry comprises internet of things (IoT) message issuing circuitry configured to issue polling messages for an IoT device.

10. The polling apparatus according to clause 9, wherein the polled device comprises an embedded subscriber identity module (eSIM) IoT remote manager (eIM).

11. The polling apparatus according to any of clauses 9 and 10, wherein the polling filtering circuitry comprises an IoT profile assistant (IPA).

12. A method for controlling issuing of polling messages, comprising:
   - responsive to a polling trigger requesting issuing of a given polling message over a network to a polled device:
     - determining whether an active domain name system (DNS) server belongs to a set of one or more polling permitted DNS servers; and in response to determining that the active DNS server does not belong to the set of polling permitted DNS servers, prohibiting issuing of the given polling message.

13. A network control apparatus, comprising:
polling status determination circuitry configured to determine a desired polling status for a given polling apparatus, the desired polling status indicating whether the given polling apparatus is permitted to issue at least one polling message over a network; and
polling control circuitry configured to issue one or more control messages to request that the given polling apparatus updates an indication of an active domain name system (DNS) server in dependence on the desired polling status.

14. The network control apparatus according to clause 13, wherein in response to the desired polling status indicating that the given polling apparatus is permitted to issue the at least one polling message, the polling control circuitry is configured to issue the one or more control messages requesting that the given polling apparatus updates the indication of the active DNS server to indicate an active DNS server belonging to a set of one or more polling permitted DNS servers.

15. The network control apparatus according to any of clauses 13 and 14, wherein in response to the desired polling status indicating that the given polling apparatus is not permitted to issue the at least one polling message, the polling control circuitry is configured to issue the one or more control messages requesting that the given polling apparatus updates the indication of the active DNS server to indicate an active DNS server excluded from a set of one or more polling permitted DNS servers.

16. The network control apparatus according to any of clauses 13 to 15, wherein the polling status determination circuitry is configured to determine that polling is permitted for the given polling apparatus in response to a determination of a requirement to issue a message to the given polling apparatus.

17. A method for controlling a network, comprising:
determining a desired polling status for a given polling apparatus, the desired polling status indicating whether the given polling apparatus is permitted to issue at least one polling message over the network; and
issuing a control message to request that the given polling apparatus updates an indication of an active domain name system (DNS) server in dependence on the desired polling status.

18. The method according to clause 17, comprising:
responsive to a polling trigger requesting issuing of a given polling message by the given polling apparatus:
determining whether the active DNS server belongs to a set of one or more polling permitted DNS servers; and
in response to determining that the active DNS server does not belong to the set of polling permitted DNS servers, prohibiting issuing of the given polling message.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. A polling apparatus, comprising:
message issuing circuitry configured to issue at least one polling message over a network to a polled device, and
polling filtering circuitry responsive to a polling trigger requesting that the message issuing circuitry issues a given polling message, to:
determine whether an active domain name system (DNS) server belongs to a set of one or more polling permitted DNS servers; and
in response to determining that the active DNS server does not belong to the set of polling permitted DNS servers, prohibit the message issuing circuitry from issuing the given polling message.

2. The polling apparatus according to claim 1, wherein the polling filtering circuitry is responsive to determining that the active DNS server does belong to the set of polling permitted DNS servers to permit the message issuing circuitry to issue the at least one polling message.

3. The polling apparatus according to claim 1, comprising control circuitry responsive to a control message received over the network to update an indication of one or more active DNS servers.

4. The polling apparatus according to claim 3, wherein the control circuitry is configured to update the indication of an active DNS server to indicate a replacement DNS server identified by a DNS update message.

5. The polling apparatus according to claim 3, wherein the control message comprises a request for the polling apparatus to reconnect to the network.

6. The polling apparatus according to claim 1, comprising non-polling message issuing circuitry configured to issue at least one non-polling message over the network; and
whether issuing of the at least one non-polling message is permitted is independent of whether the active DNS server belongs to the set of one or more polling permitted DNS servers.

7. The polling apparatus according to claim 1, comprising polling message generation circuitry to generate the at least one polling message, wherein the polling message generation circuitry is configured to provide the polling trigger.

8. The polling apparatus according to claim 7, wherein the polling message generation circuitry is configured to generate the at least one polling message based on a polling timer.

9. The polling apparatus according to claim 1, wherein the message issuing circuitry comprises internet of things (IoT) message issuing circuitry configured to issue polling messages for an IoT device.

10. The polling apparatus according to claim 9, wherein the polled device comprises an embedded subscriber identity module (eSIM) IoT remote manager (eIM).

11. The polling apparatus according to claim 9, wherein the polling filtering circuitry comprises an IoT profile assistant (IPA).

12. A method for controlling issuing of polling messages, comprising:

responsive to a polling trigger requesting issuing of a given polling message over a network to a polled device:

determining whether an active domain name system (DNS) server belongs to a set of one or more polling permitted DNS servers; and in response to determining that the active DNS server does not belong to the set of polling permitted DNS servers, prohibiting issuing of the given polling message.

13. A network control apparatus, comprising:

polling status determination circuitry configured to determine a desired polling status for a given polling apparatus, the desired polling status indicating whether the given polling apparatus is permitted to issue at least one polling message over a network; and polling control circuitry configured to issue one or more control messages to request that the given polling apparatus updates an indication of an active domain name system (DNS) server in dependence on the desired polling status.

14. The network control apparatus according to claim 13, wherein in response to the desired polling status indicating that the given polling apparatus is permitted to issue the at least one polling message, the polling control circuitry is configured to issue the one or more control messages requesting that the given polling apparatus updates the indication of the active DNS server to indicate an active DNS server belonging to a set of one or more polling permitted DNS servers.

15. The network control apparatus according to claim 13, wherein in response to the desired polling status indicating that the given polling apparatus is not permitted to issue the at least one polling message, the polling control circuitry is configured to issue the one or more control messages requesting that the given polling apparatus updates the indication of the active DNS server to indicate an active DNS server excluded from a set of one or more polling permitted DNS servers.

16. The network control apparatus according to claim 13, wherein the polling status determination circuitry is configured to determine that polling is permitted for the given polling apparatus in response to a determination of a requirement to issue a message to the given polling apparatus.

17. A method for controlling a network, comprising:

determining a desired polling status for a given polling apparatus, the desired polling status indicating whether the given polling apparatus is permitted to issue at least one polling message over the network; and issuing a control message to request that the given polling apparatus updates an indication of an active domain name system (DNS) server in dependence on the desired polling status.

18. The method according to claim 17, comprising:

responsive to a polling trigger requesting issuing of a given polling message by the given polling apparatus:

determining whether the active DNS server belongs to a set of one or more polling permitted DNS servers; and in response to determining that the active DNS server does not belong to the set of polling permitted DNS servers, prohibiting issuing of the given polling message.

* * * * *